United States Patent [19]
Westfall, Jr.

[11] 3,942,149
[45] Mar. 2, 1976

[54] SOLID STATE DEPTH SOUNDER
[75] Inventor: Wilmer J. Westfall, Jr., Farmers Branch, Tex.
[73] Assignee: Texas Instruments Incorporated, Dallas, Tex.
[22] Filed: Aug. 19, 1974
[21] Appl. No.: 498,801

[52] U.S. Cl................... 340/3 R; 340/1 C; 340/3 C; 340/3 F; 343/13 R
[51] Int. Cl.²......................... G01S 9/68; G01S 7/60
[58] Field of Search............. 340/3 C, 3 R, 3 F, 1 C; 343/13 R

[56] References Cited
UNITED STATES PATENTS

| | | | |
|---|---|---|---|
| 3,553,711 | 1/1971 | Kurimura et al. | 340/3 R |
| 3,588,795 | 6/1971 | Linardos et al. | 340/3 R |
| 3,735,334 | 5/1973 | Ahrens et al. | 340/3 R |
| 3,750,095 | 7/1973 | Olesen | 340/3 R |
| 3,803,629 | 4/1974 | Walsh et al. | 340/3 R |
| 3,835,447 | 9/1974 | Lowrance | 340/3 R |

*Primary Examiner*—Richard A. Farley
*Attorney, Agent, or Firm*—Harold Levine; Edward J. Connors, Jr.; Stephen S. Sadacca

[57] ABSTRACT

A solid state depth sounding system, for measuring depth and detecting the presence of underwater objects, comprises an oscillator, producing high frequency electrical signals, a transmitter, for intermittently amplifying those signals, a transducer, and a receiver. The transducer produces high frequency sound impulses from the intermittent amplified signals, and transmits those impulses through the water until they are reflected by some underwater object. The transducer also picks up the reflected sound impulses and provides a high frequency electrical signal to the receiver which amplifies and detects it to produce a return pulse related in analog value to the strength of the reflected signal. The time delay between the transmission and reception of the high frequency sound impulse, and consequently the distance to the reflecting object, is measured by applying either a transmit pulse or a return pulse to the serial input of a multibit BBD or CCD shift register with a specified number of parallel outputs. When the contents of the shift register are sampled, the pulse or pulses in the register are used to drive display elements corresponding to the bit or bits in which those pulses are found. A properly calibrated display, driven by these pulses will indicate the presence and depth of underwater reflecting objects. By applying the analog return pulse to the input of the shift register, and by sampling at predetermined intervals the display will indicate, by the relative intensity of the driven display elements, the relative strength of the reflected signals. A number of such solid state depth sounders may be used to provide multidirectional depth measuring and detection with a single coordinated display. The display device and signal processing equipment are designed to indicate the lateral distance to a reflecting object as well as its depth.

23 Claims, 15 Drawing Figures

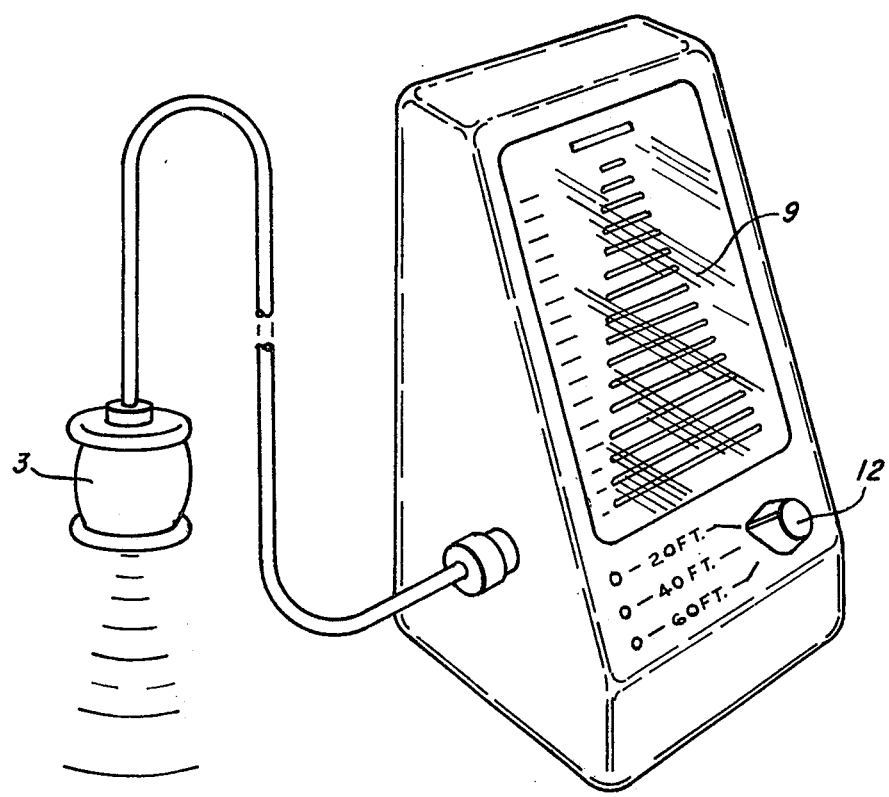
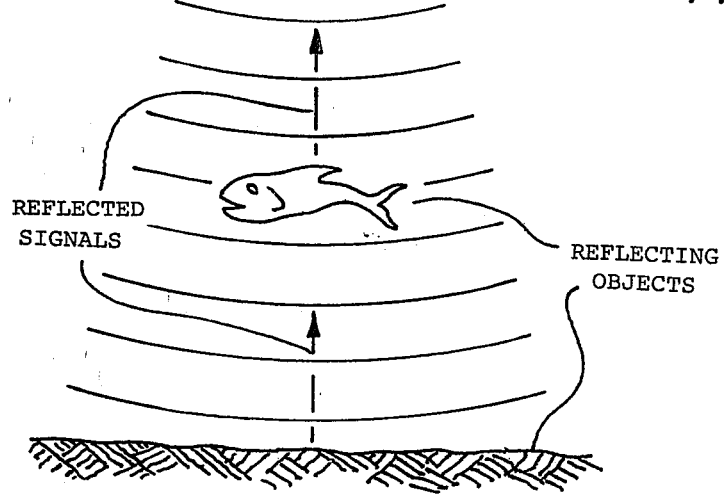
Fig.1

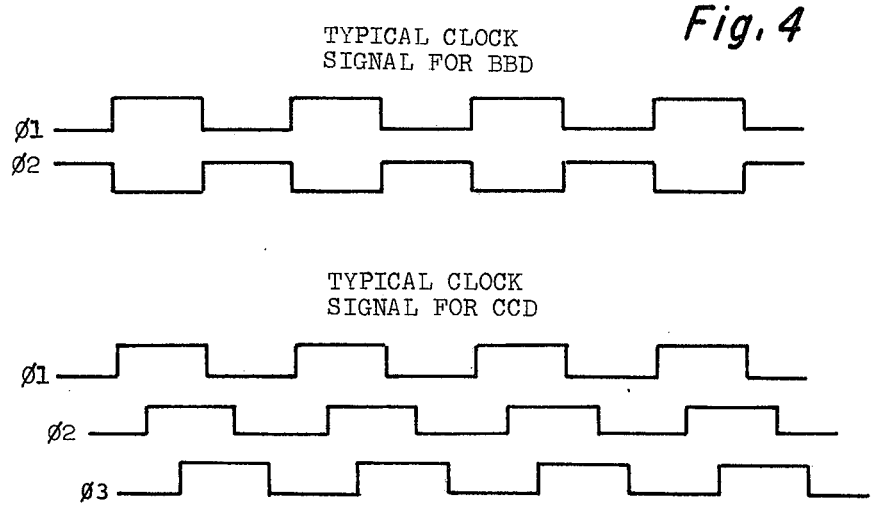
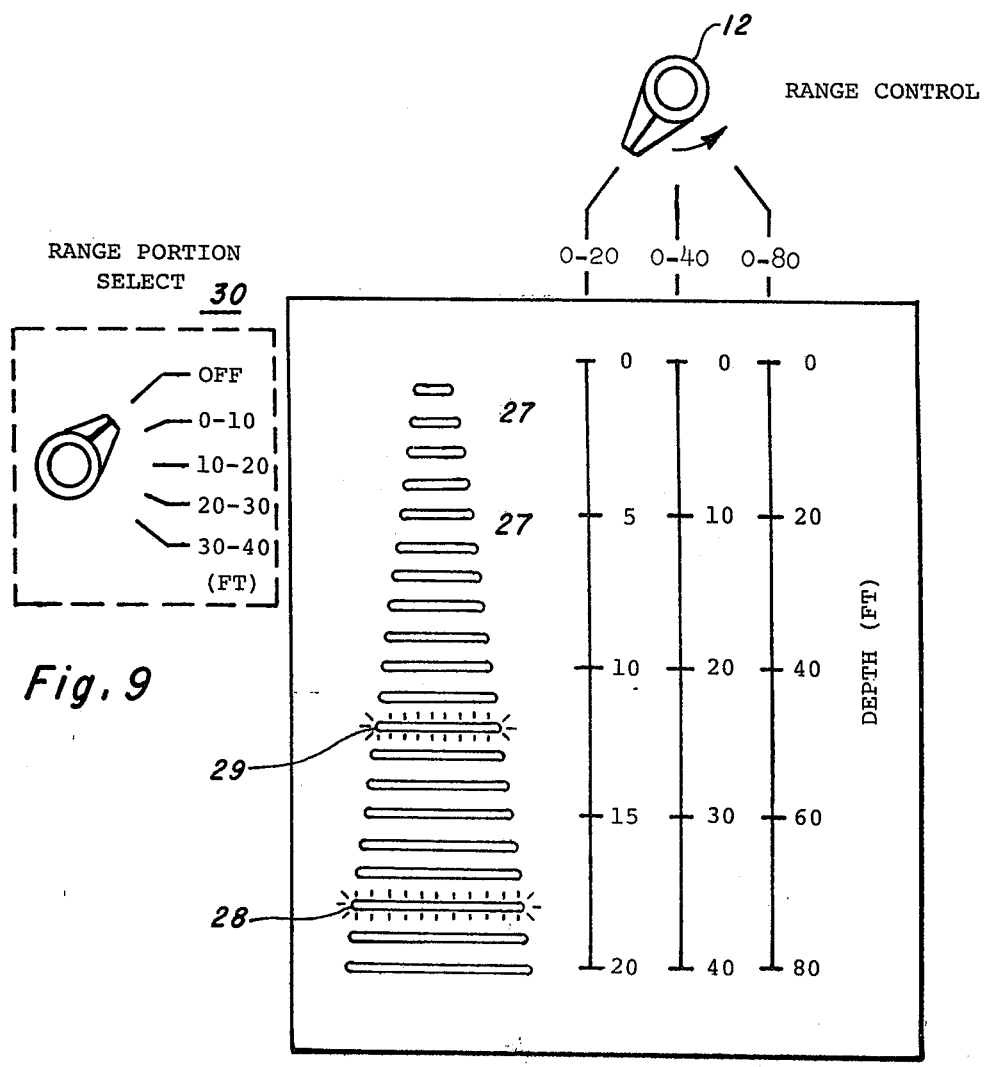

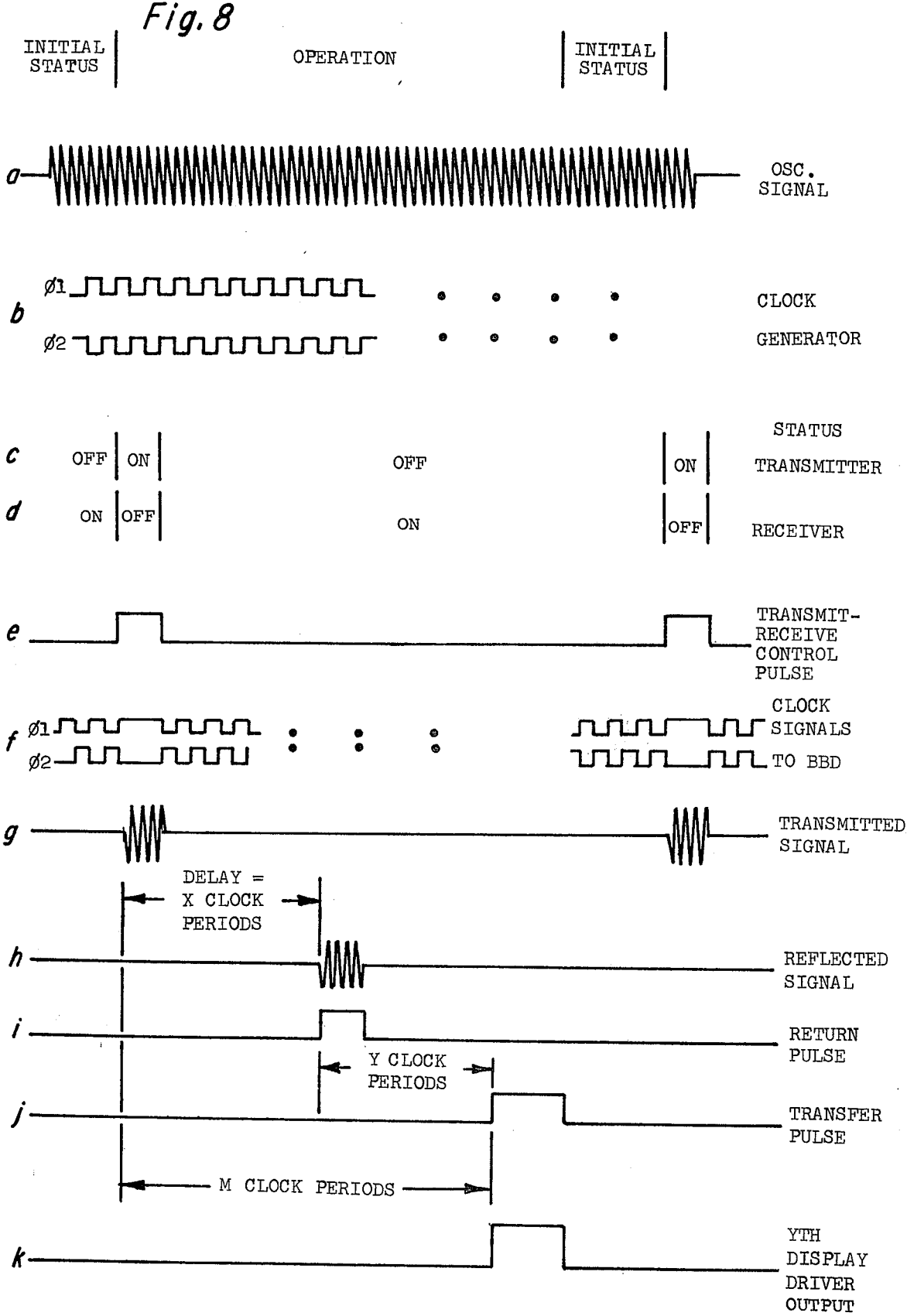

SOLID STATE DEPTH SOUNDER

FIELD OF INVENTION

This invention relates to depth sounding or depth measuring systems, and more particularly to a depth sounding system with variable ranges of measurement and a variety of possible visual displays, utilizing a shift register as the primary means for measuring time delay between transmission of a high frequency sound impulse and return of a reflected signal, and thereby depth.

DESCRIPTION OF THE PRIOR ART

The depth sounders which are presently known all employ basically the same principles. A high frequency sound impulse is transmitted into the water. When the impulse strikes an object, a portion of the signal is reflected. The reflected signal is received, and a measurement of the time delay is made in order to determine the distance to the reflecting object. There may be numerous reflecting objects and consequently numerous reflected signals of varying strengths. All these signals are displayed in an analog fashion such that, for example, a weak signal produces a dim display. Presently, the sound impulse is generated by means of a flywheel driven by a mechanically-governed DC motor. To the flywheel is attached a permanent magnet which, when properly adjusted relative to a pickup coil, generates an electrical impulse in the coil. The electrical impulse causes the local oscillator to be triggered for a short period of time. This burst of oscillations is amplified and applied to a transducer which transmits the sound impulse directionally through the water. The time delay measurement and display of depth measured are now accomplished by receiving and linearly amplifying the reflected signals to a level sufficient to fire a neon bulb attached to the aforementioned flywheel. The display is circular, and the position of the flywheel when the neon bulb is fired is calibrated to show distance to the reflecting object or objects. Since the reflected signals are analog values, the relative intensity of the light emitted by the neon bulb provides an indication of the strength of the reflected signal.

The present devices used for measuring depth are not entirely satisfactory because of mechanics involved in the depth measuring process, susceptibility to moisture and vibration, the environment in which the devices must operate, and the inherent limitations on the type of display. The mechanically-governed motor must operate at a very precise speed in order to obtain the desired accuracy. The vibrations, excessive temperature variations, and moisture create significant obstacles to obtaining accuracy with the motor and increase the likelihood of motor failure. The slip ring and brush arrangement for the flywheel is one more point of possible failure. Because the carbon brushes and slip rings are quite fragile and subject to corrosion, the moisture and mechanical vibration from the boat create serious problems with breakage and other damage. The flywheel is constructed from a fibrous material which can absorb water and cause warpage. The warpage makes it extremely difficult to adjust the permanent magnet spacing which provides the oscillator trigger signal. Warpage can render the device inoperable. Because the display is produced by the rotating flywheel, a circular display is required.

SUMMARY OF THE INVENTION

The principal object of this invention is to eliminate the mechanical construction of depth sounding devices by performing the mechanical operation electrically. Replacing the mechanical functions with electrical operations will improve accuracy and increase the reliability of the depth sounder.

Another object of this invention is to increase design flexibility thereby allowing variable ranges, the examining a portion of a range in greater detail, multibeam information display and many other possibilities.

Yet another object of this invention is to increase the types of display which may be used with depth sounding devices. Visible light emitting diode displays in a variety of configurations are possible, a heat sensitive strip chart driven at a rate proportional to the boat's speed would provide a contour of the bottom, and a liquid crystal display might also be used.

A still further object of this invention is to provide a means, in conjunction with a hard copy display device, to utilize more than one directional sound impulse and thereby measure depth in a number of directions. This would enable the device to be used for contour mapping of an area of the bottom wider than the mere line of travel of the boat.

In accordance with the aforementioned objects, a master oscillator operating at a high frequency continuously provides a signal to an intermittently operated transmitter which impresses short bursts of the high frequency signal on a transducer. The transducer transmits the burst through the water until it reaches a reflecting object from which a portion of the signal is returned to the transducer. A receiver-detector amplifies and detects this return signal to produce a return pulse. A shift register is used to measure the time delay between the transmitting of the sound impulse through the water and the return of the reflected signal. In one embodiment, a marker pulse is applied to the input of the shift register, and the position of the marker pulse at the time the return signal is detected indicates the above mentioned time delay and can be calibrated as the distance to the reflecting object. The shift register operates in a digital mode in this embodiment. The marker pulses which are the inputs to the shift register (and ultimately are the signals which are displayed) are of uniform pulse height, thus providing a display of only the presence or absence of a reflecting object and its depth. The relative strength of the reflected signal is not displayed. In another embodiment, the return pulse is applied to the input of the shift register when it appears at the output of the receiver-detector. The contents of the shift register are sampled at predetermined time intervals and the bit position of the return pulse at the time of sampling indicates the time delay (to which distance can be directly related). In this embodiment, the register operates to shift an analog pulse which eventually is used to drive the display. The pulse height of the return pulse corresponds to the strength of the reflected signal. This mode of operation allows the display to show the presence of a reflecting object, its depth, and the relative strength of the return signal. In both of these embodiments, the ranges of depth measurement may be varied by varying the clock frequency which is used to clock the shift register. Both embodiments lend themselves to a great deal of design flexibility in the type of display technique which may be used. Still another embodiment utilizes a number of solid state depth sounding devices so as to measure depth in a number of directions. A hard copy printer may be used with this device to produce a permanent display of the depth sounding data. An array of visible light emitting diodes provides another display technique for this multidirectional capability.

The novel features which are believed to be characteristic of this invention are set forth in the appended claims. The invention may best be understood, however, by reference to the following detailed description of illustrative embodiments, read in conjunction with the accompanying drawings.

IN THE DRAWINGS

FIG. 1 is a pictorial view of a solid state depth sounder embodying the concept of this invention.

FIG. 4 is a diagram illustrating typical clock signals for a bucket-brigade device and a charge-coupled device.

FIG. 8 is a timing diagram illustrating the operation of the second embodiment of this invention.

FIG. 9 is a pictorial representation of a linear visible light emitting diode display which might be utilized with embodiments of the present invention.

DESCRIPTION OF THE PREFERRED EMBODIMENTS

First Embodiment

With reference to FIG. 1, a typical depth sounder is illustrated which embodies the principles of the present invention. The system is shown transmitting high frequency sound impulses from a transducer 3. These signals encounter reflecting objects and are reflected back to the transducer 3. When applied to the depth sounder unit and processed, these reflected signals may be used to indicate depth to the reflecting objects on the linear visible light emitting diode display 9. The range of measurement may be varied by means of the range control device 12.

Figure 2:
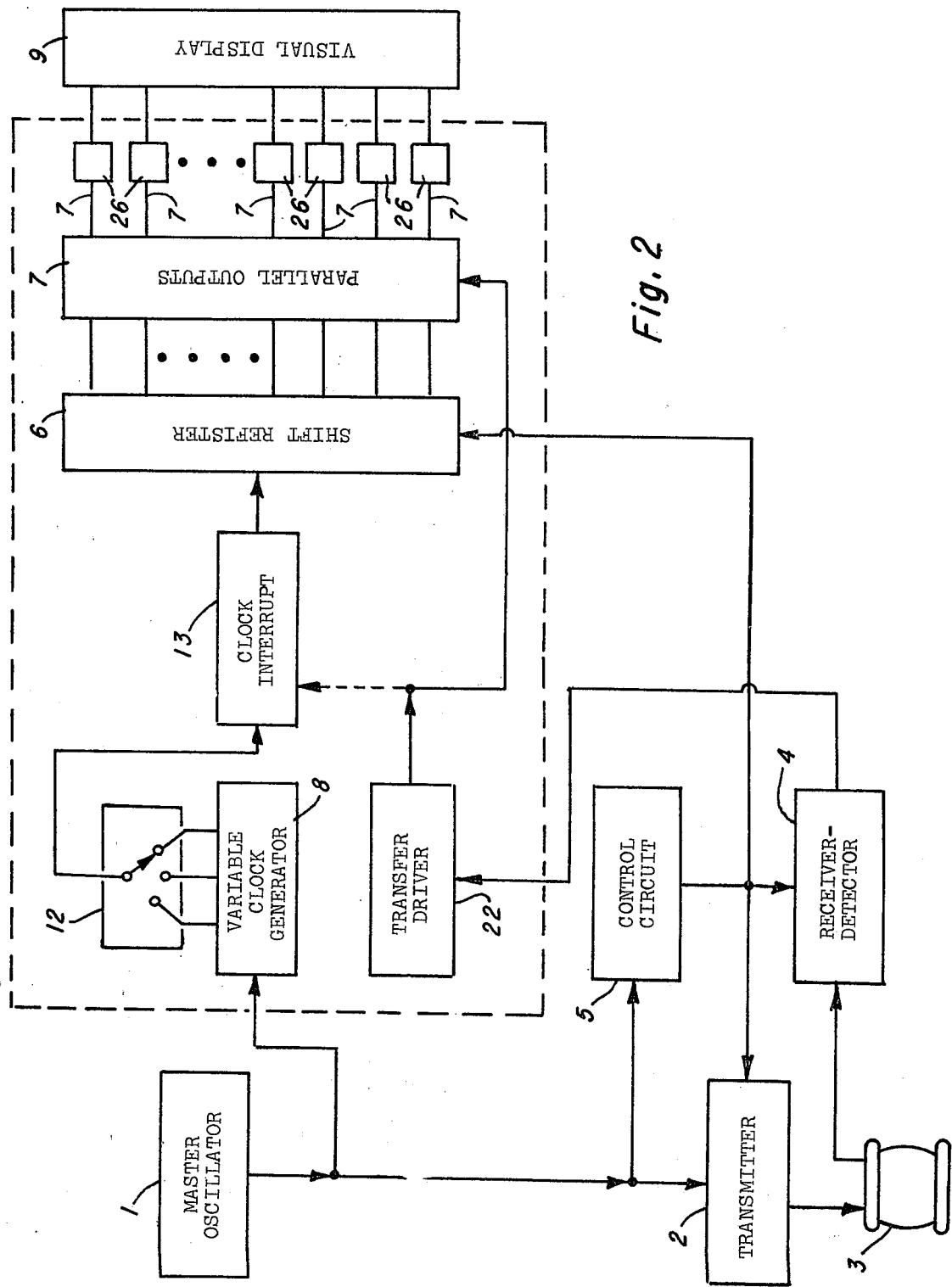
FIG. 2 is a block diagram illustrating the major components of one embodiment of this invention.
Figure 3A:
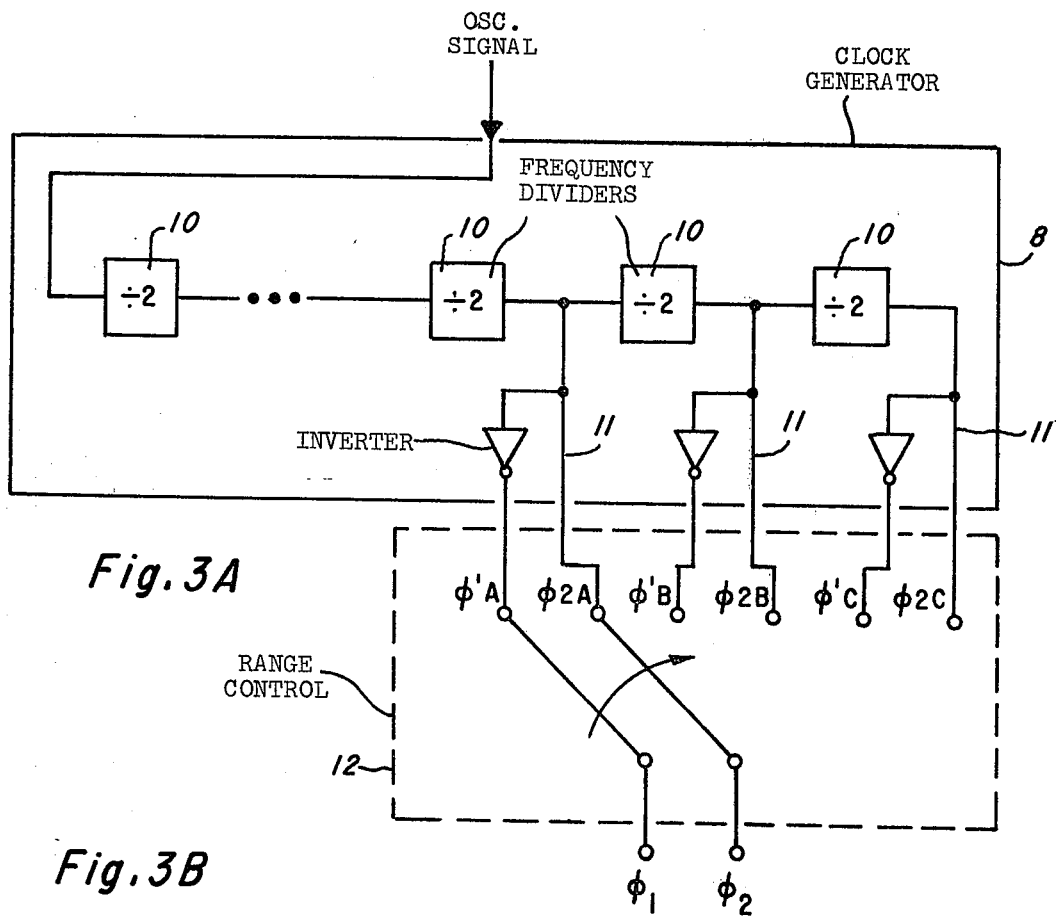
FIGS. 3A and 3B are diagrams presenting the method by which clock frequencies may be obtained and showing the relationship of the various clock frequencies to the ranges of the solid state depth sounder.
Figure 3B:
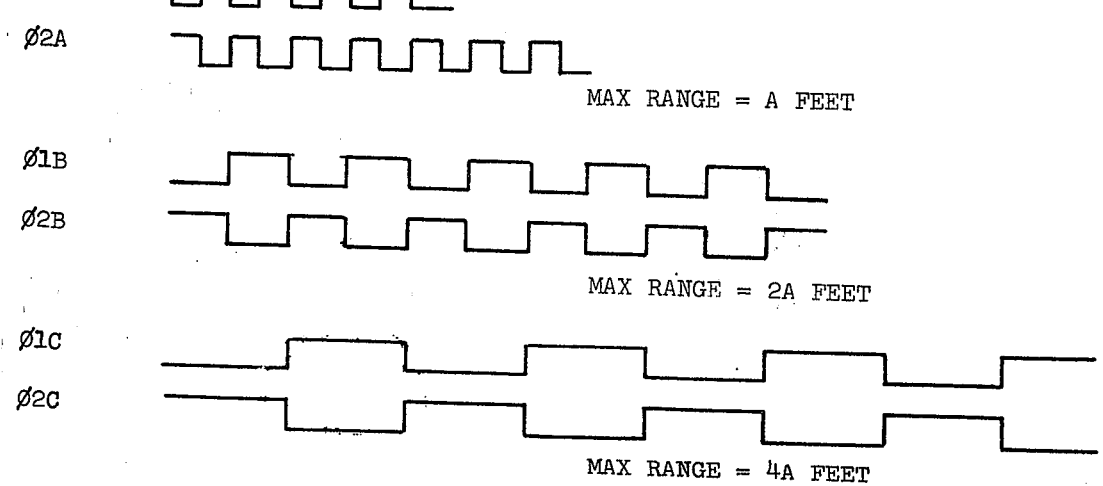

Referring to FIG. 2, the system includes a high frequency master oscillator 1, with a high frequency output signal as shown in FIG. 3B. This output signal is supplied to the input of the transmitter 2 which consists of a power amplifier capable of amplifying the low level signal when the transmitter is turned on for short periods of time. The amplified high frequency burst is impressed on a transducer 3 which can send this signal through the water and receive the reflected signal in the conventional manner. A receiver-detector 4 is used to amplify and detect the reflected signal from the transducer 3. The receiver-detector 4 consists of a number of band pass amplifiers, a twin-T network filter centered on the oscillator frequency, and an envelope detector. In response to the reflected signal, the output of the receiver-detector 4 is a pulse which, like the reflected signal, is delayed in relation to the transmitted impulse from the transducer 3. The delay time is proportional to the distance the impulse traveled to the reflecting object. The components of this invention such as the master oscillator 1, transmitter 2, transducer 3, and receiver-detector 4, are well known to those skilled in the RF and sonar fields and are therefore shown only schematically and will not be described in detail here. A control circuit 5 operates the transmitter 2 and receiver-detector 4 by means of a transmit-receive control pulse generated at predetermined intervals. The transmitter 2 is enabled, and the receiver-detector 4 is disabled by this pulse. The receiver 4 is disabled during the time the transmitter 2 is operating in order to prevent the transmitted impulse from being fed into the receiver 4, thereby saturating the amplifiers. This scheme provides for a negligible receiver-recovery time. Reflected signals can be received and read accurately within a very short time, allowing accurate measurement at even very short distances. The repetition rate of the transmit-receive control pulse determines the repetition rate of the transmitted signal, and its pulse-width determines the length of time the high frequency signal is transmitted.

There are alternative embodiments of the time delay measurement concept involved in this invention. Each of these embodiments utilizes the components described above. The difference lies in the method in which the information obtained from the use of these components is processed. The first embodiment, referring again to FIG. 2, includes an N-bit BBD or CCD 6 with N parallel outputs 7, which is used as a shift register-delay line; the variable frequency clock generator/range control circuit 8, which consists of standard frequency dividers used to divide the high frequency square wave signal; and a display device 9.

The variable clock generator/range control circuit 8 is designed to produce a clock frequency by division of the high frequency square wave signal from the master oscillator 1. This frequency is applied to clock the BBD or CCD shift register 6.

With reference to FIG. 3A, the clock generator circuit is of the conventional type; it consists of standard frequency dividers 10 used to lengthen the period of the signal from the master oscillator 1, and a number of outputs 11 along the chain of dividers 10. A particular output may be selected by operation of the range control switch 12 to vary the clock frequency thereby altering the depth measurement range. The clock frequency determines the amount of time that is required to shift the marker impulse through the N registers of the BBD or CCD device 6. Unless the reflected signal appears at the output of the receiver-detector 4 within N periods of the clock signal, the marker pulse will be shifted out of the BBD or CCD 6 and not used. Thus, for deeper measurements, the clock period must be lengthened (clock frequency decreased). FIG. 3B illustrates the correspondence of clock frequency and maximum range.

The shift register which is involved in the operation of this invention may be either an N-bit BBD or an N-bit CCD with N parallel outputs. The basic principles of both these devices are well known. Publications which describe the theory of these devices are "Bucket Brigade Electronics - New Possibilities for Delay, Time-Access Conversion and Scanning" by Sangster and Teer, IEEE Journal of Solid-State Circuits, June 1969, pp. 131–136 and "The New Concept for Memory and Imaging: Charge Coupling" by Altman, Electronics, June 21, 1971, pp. 50–58. Although TTL or MOS shift register devices with the same general characteristics would be quite satisfactory, none are presently available with the required parallel outputs. The embodiments described herein are shown in the use of a BBD shift register; however, a CCD shift register might be utilized just as easily with only minor modifications. The basic operational difference in the two devices is the number and type of clock signals which must be provided.

Referring to FIG. 4, a BBD typically requires a two-phase clock signal while the CCD must normally have three phases or more to perform the serial shifting operation. Without important changes, the variable clock generator/range control can provide the proper clocking signals for a CCD shift register. The methods of input and transfer-out are the same for the two devices.

Figure 5:
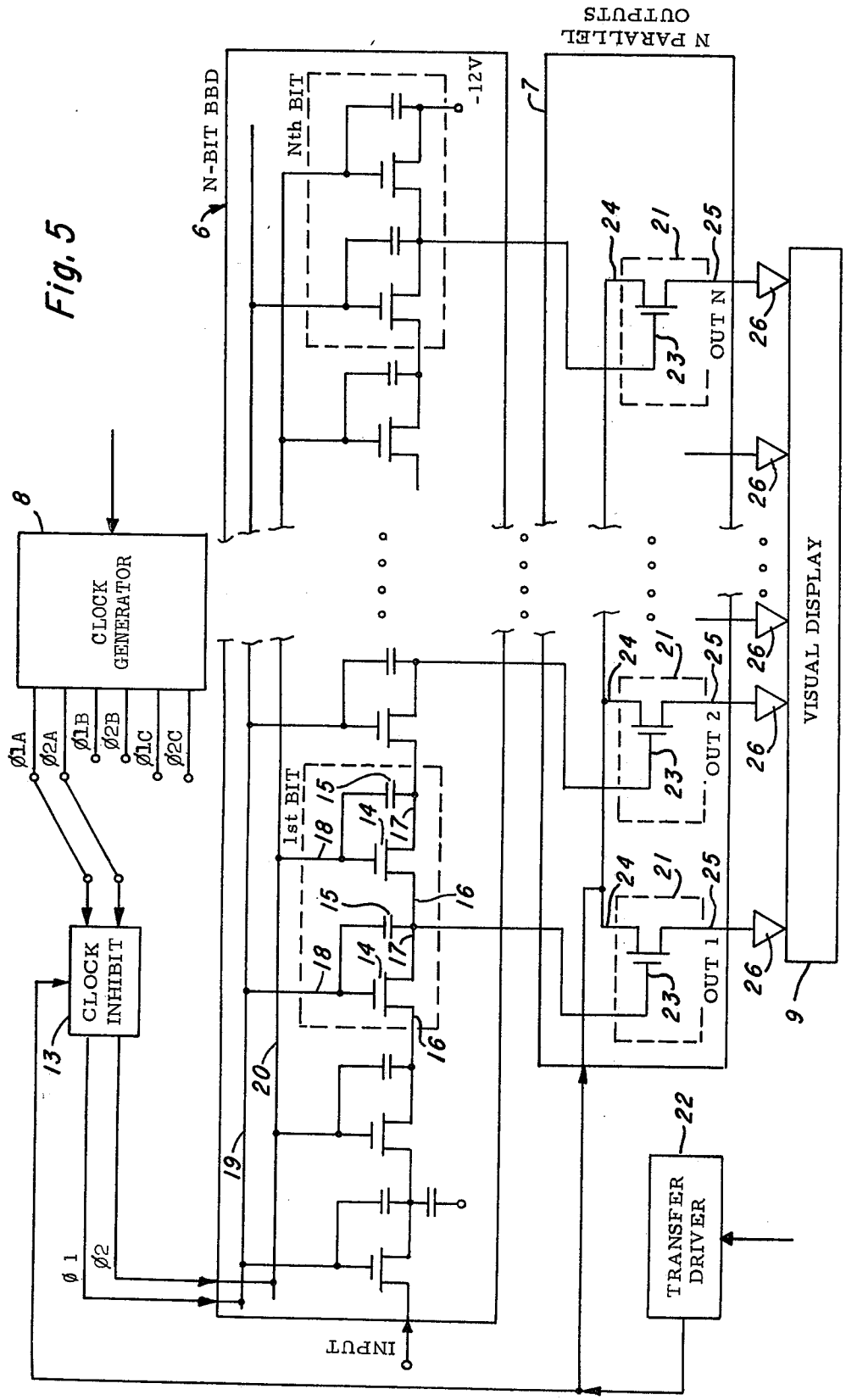
FIG. 5 is a schematic representation of an N-bit bucket-brigade device with N parallel outputs which is shown as it would typically be connected in an embodiment of this invention.

Referring to FIG. 5, there is shown a schematic diagram of the equivalent circuit of an N-bit bucket brigade shift register 6 with N parallel outputs 7. The equivalent circuit is shown using field effect transistors 14 as switching elements and capacitors 15 as storage elements. The equivalent circuit consists of a number of FET's 14 connected in series with the source 16 of one connected to the drain 17 of the next transistor. The gates 18 of the FET's 14 are connected to the clock lines 19 and 20, adjacent gates being connected to alternate clock lines. Capacitors 15 are connected between the gate 18 and the source-drain connection 16 and 17. The N parallel outputs 7 consist of N FET's 21 connected as source followers to sample each of the N bits in the BBD 6; the gate 23 of each output transistor 21 is connected to the source-drain connection 16 and 17 of adjacent FET's 14 in the BBD 6. The drains 24 of all the parallel output transistors 21 are connected to the output of the transfer driver 22. The source 25 of each one of the parallel output transistors 21 is connected to an individual display driver 26. While the range of the depth sounder is determined by the clock frequency, the resolution of that range is determined by the number of parallel outputs 7.

Referring to FIG. 2, the input to the transfer driver 22 is the output of the receiver-detector 4. When a return pulse appears at the input of the transfer driver 22, a transfer pulse, somewhat longer in duration than the return pulse, is produced at the output of the transfer driver 22. This transfer pulse may be applied to the clock interrupt circuit 13 to stop the clocking of the BBD or CCD shift register 6. If so, the depth sounder will provide only a display of the depth to the shallowest reflecting object. In the alternative, if the transfer pulse is not applied to interrupt clocking, more than one reflected signal may be received and displayed. With reference again to FIG. 5, the transfer pulse is applied to the common drains 24 of the parallel output transistors 21 to accomplish transfer of the contents of the BBD or CCD shift register 6 to the individual display drivers 26. The marker pulse being shifted through the register 6 will be stopped and transferred to the appropriate display driver 26 when the transfer pulse is produced. Its bit position in the shift register 6 indicates the time delay between the sending and the return of the 200 KHz sound impulse. If clocking is not stopped by the first transfer pulse, the first reflected signal will cause a transfer and display of the marker pulse; the pulse will then continue to shift until another reflected signal is received. The transfer pulse is of longer duration than the return pulse in order to eliminate flicker from a light emitting diode display 9 and increase the brightness. Because of the speed at which the operation occurs, the displays produced by each of the reflected signals appear to be constant and simultaneous.

There are a number of display techniques which are suited for use with this invention; these will be hereinafter described in detail.

Operation

Referring to FIGS. 6a, 6c and 6d, in the system's initial status, the high frequency signal from the master oscillator is being supplied to the transmitter which is not yet operating. The master oscillator signal is also being frequency-divided by the variable clock generator/range control circuit. The clock frequencies are illustrated in FIG. 6b. The clock frequency thus produced is being used to clock the shift register.

The typical operation of this invention would begin with a transmit-receive control pulse which enables the transmitter and disables the receiver-detector. A short burst of the high frequency signal is transmitted through the water. This is illustrated by FIGS. 6e and 6f. Once this signal has been sent, the transmitter is turned off, and the receiver-detector is activated once more. The same transmit-receive control pulse which operates the transmitter and receiver is applied to the input of the shift register as a logical "one" and is transferred serially through the bits of the register at the clock frequency. This pulse, which is coincident in time to the transmitting of the high frequency signal, is used as a marker pulse.

When the high frequency sound impulse strikes a reflecting object, a portion of the signal is reflected. After a time delay proportional to the distance traveled, the reflected signal is picked up by the transducer, and it is amplified and detected by the receiver-detector.

Although the invention is capable of receiving and processing two or more reflected signals from a number of reflecting objects at various depths, for the purposes of illustration, the operation of this embodiment will be described with respect to only one such reflected sound impulse. This operation will be identical to the actual operation with respect to the first reflected signal.

The output of the receiver-detector 4 is a pulse coincident in time to the reflected signal. The delayed signal and return pulse are shown in FIGS. 6g and 6h.

With reference to FIGS. 6h and 6i, the return pulse, which appears, along with the reflected signal, some time after the high frequency sound impulse was transmitted (for example, X clock periods), is the input to the transfer driver which profuces a slightly longer pulse having two functions. This transfer pulse may be the input to the clock interrupt circuit which stops the shifting of the marker pulse through the BBD or CCD. If the clock frequencies are interrupted, the shifting of the register 6 will stop, and the marker pulse will be transferred out of the register 6 to drive a display which will indicate the depth of a reflecting object. Since the shifting of this pulse was stopped by the first reflected signal, only the distance to the first reflecting object will be displayed. In a slightly different mode of operation, the transfer pulse is not applied to interrupt clocking. Each reflected signal produces a transfer of the marker pulse and consequently a display of the depth to that particular reflecting object. In this mode, however, the marker pulse is allowed to continue shifting after each transfer. Thus a number of depths of various reflecting objects may be displayed. In either case, the transfer pulse is supplied to the N parallel outputs of the BBD or CCD to accomplish the transfer-out of the contents of the N bits of the BBD or CCD. The contents of the N bits are transferred to N individual display drivers. In the case described here, where there is only one reflecting object, the marker pulse which is in the Xth bit of the BBD or CCD is the only pulse in the shift register. Thus, the Xth display driver is the only one which shows an output. See FIG. 6j. The bit position of the marker pulse is directly proportional to the transmit-return time delay and hence the distance to the reflecting object. Any of a number of displays can be calibrated to show bit position of the marker pulse as distance. After the contents of the BBD or CCD have been transferred out and a calibrated display has been produced, the system is once again in its initial status. The cycle begins again with a transmit-receive control pulse generated by the control circuit. The control circuit generates these control pulses at predetermined time intervals which must be longer than the time required for a transmitted impulse to reach a reflecting object at the maximum range and return as a reflected signal.

Second Embodiment

Figure 7:
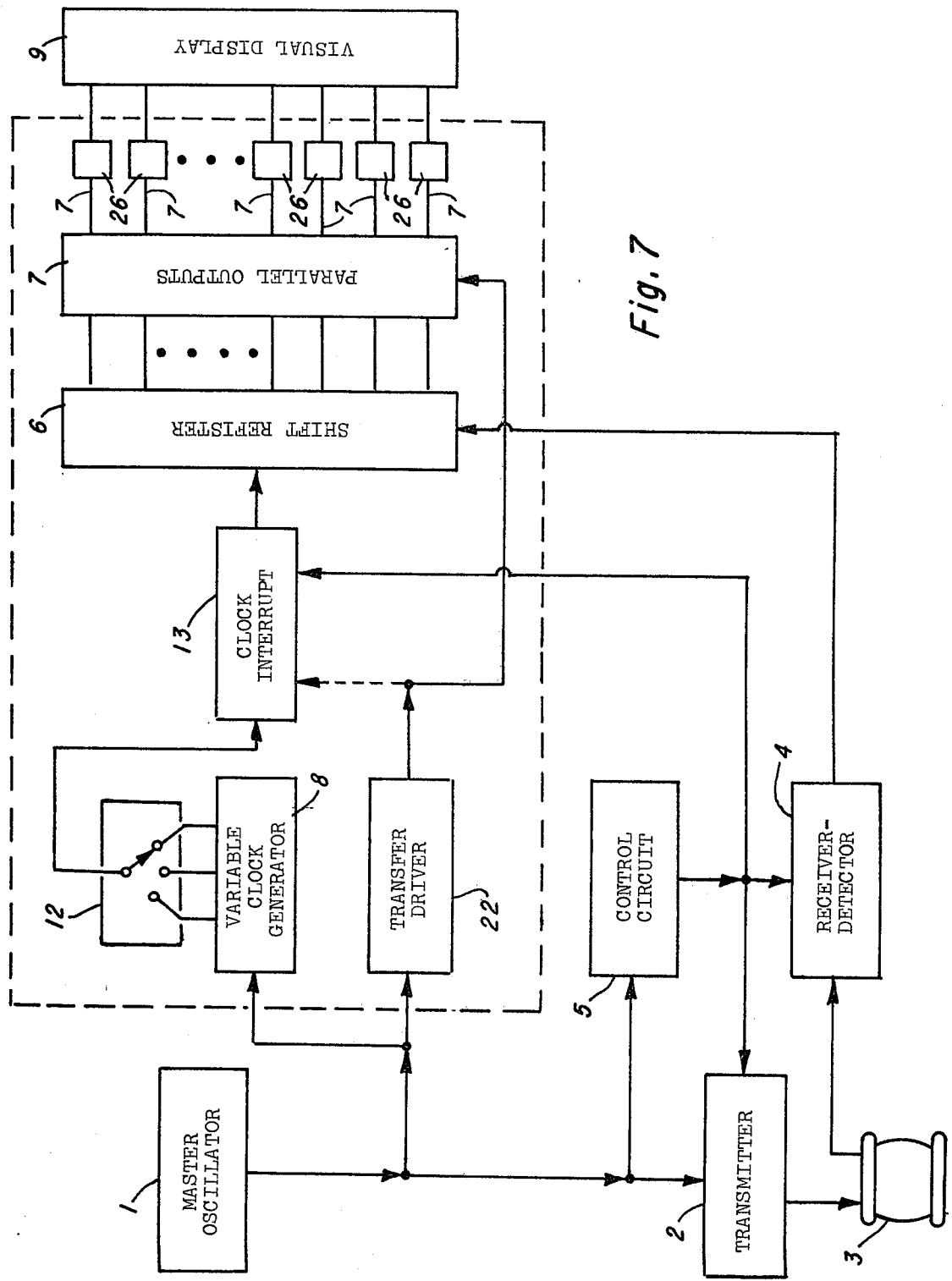
FIG. 7 is a block diagram showing the major components of a second embodiment of this invention.

An alternative embodiment of the principles involved in this invention is illustrated diagramatically in FIG. 7. The external devices, master oscillator 1, transmitter 2, transducer 3, receiver-detector 4 and control circuit 5, are the same as in the above mentioned embodiment. The basic difference in the embodiments lies in the scheme for measuring time delay between the sending of the high frequency impulse and its return as a reflected signal.

Referring to FIG. 7, this system also includes an N-bit BBD 6 with N parallel outputs 7; this device is identical to the device previously described. The input to the BBD shift register 6 is the amplified and detected return pulse at the output of the receiver-detector 4. This pulse is, of course, coincident in time and duration to the reflected high frequency signal which is the input to the receiver-detector 4. The return pulse is an analog value which is directly related to the strength of the reflected signal with which it is associated. The clock frequency, the output of the variable clock generator/range control 8, is supplied to the BBD or CCD shift register 6 through a clock interrupt circuit 13. This circuit interrupts the clock frequency to the shift register 6 whenever a pulse appears at one of its inputs. The interruption is for the duration of the pulse. The output of the control circuit 5 is applied to one of these inputs; the clock frequency is interrupted when a transmit-receive control pulse is produced. The transfer driver 22 also may be connected to an input of the clock interrupt circuit 13; the clocking of the BBD or CCD shift register 6 may thus be discontinued for the duration of the transfer pulse.

In this embodiment, the transfer driver circuit 22 generates a transfer pulse at predetermined time intervals; normally the repetition rate of the transfer pulse is the same as that of the transmit-receive control pulse, but the transfer pulse is producted at some given period of time, M clock periods, after the transmit-receive control pulse. As previously mentioned, the transfer pulse may be supplied to the clock interrupt circuit 13, and it is used to operate the parallel outputs 7 of the BBD or CCD shift register 6 by supplying a voltage at the common drains of the parallel output field effect transistors, thereby providing for transfer of the contents of the BBD shift register 6 to the display drivers 26. The appropriate linear display driver 26 will indicate the bit position of any return pulse which has been supplied to the input of the BBD or CCD shift register 6. The bit position of the return pulse when the shift register is sampled is related to the time delay of the return signal and thus is also related to the depth of the reflecting object. Since the analog return pulse which is being shifted through the register 6 is used to drive the display 9, the relative strength of the reflected signal will be indicated by the relative intensity of the display means 9. If the display 9 consists of a number of VLED's representing various depths, a strong signal reflected from one depth will cause the associated VLED to produce a bright display. A weaker reflected signal will correspondingly cause the VLED associated with that depth to produce a dim display.

If there are, for example, M clock periods between the transmit-receive control pulse and the transfer pulse, there will be, correspondingly, M clock periods in which the clock is operating and the BBD 6 is shifting. When N, the number of bits and the number of parallel outputs 7 in the BBD shift register 6, is less than or equal to M, only the last N/M of the total range may be displayed at a resolution dependent on the value of M. When N is greater than M, however, the resolution is dependent on the value of N. These parameters may be specified as required by a given system. The value of M, the number of clock periods at which the BBD shift register 6 is operated, is determined by the variable clock generator/range control circuit 8, which determines the length of the clock periods. The value of M may also be determined by the preset time interval at which the transfer driver 22 supplies the transfer pulse. The value of N is a matter of selection of the BBD which is to be used. Thus, the values of N and M may be selected so as to provide the proper range and resolution. It is by an adaptation of this principle that various portions of a range may be examined in greater detail or with high resolution.

Operation

The initial status of this alternative system is the same as that found in the operation of the previously described embodiment. With reference to FIGS. 7 and 8, the master oscillator signal is being used to produce a clock frequency for the BBD or CCD shift register 6. The transmitter 2 has present at its input the high frequency signal from the oscillator but is disabled. The initial status is displayed in FIGS. 8a, 8b, 8c, and 8d.

A typical operation cycle begins with the production of the first of a series of transmit-receive control pulses which are generated at predetermined time intervals. This pulse activates the transmitter 2 and disables the receiver-detector 4; it is also supplied to the clock interrupt circuit 13, thereby interrupting the clock frequency to the BBD or CCD shift register 6. The transmitter 2 amplifies the master oscillator signal and transmits a high frequency impulse through the water. Once this signal is sent, the transmitter 2 is disabled, and the receiver 4 is again activated. During the short period of time the transmitter 2 is operating, the clock is stopped. This is illustrated by FIGS. 8c, 8d, 8e, 8f, and 8g.

In this embodiment, although operation is described with respect to only one reflected signal, there may be more than one reflecting object and hence a number of reflected signals received from various depths at various times within the operation cycle. Each of the reflecting objects will produce a return pulse to be applied to the BBD or CCD shift register 6.

Just as in the previously described embodiment, when the high frequency impulse strikes a reflecting object, a portion of the signal is reflected. After a time delay (for example, X clock periods) proportional to the distance traveled, the reflected signal is picked up by the transducer 3, and it is amplified and detected by the receiver-detector 4. From the reflected signal, the receiver-detector 4 produces a detected return pulse at its output which, like the reflected signal, is delayed from the transmission of the high frequency signal by X clock periods. The reflected signal and return pulse are simultaneous. The delayed signal and return pulse are shown in FIGS. 8h and 8i. The output of the receiver-detector 4 is applied to the input of the BBD or CCD shift register 6. Until the reflected signal is received, there will be no input to the BBD or CCD shift register 6. When the return pulse, which, like the reflected signal, is delayed in time by X clock periods, appears at the output of the receiver-detector 4, it is applied to the BBD or CCD 6 as an analog value and begins to be shifted serially through the N bits. After a predetermined time interval, M clock periods, after the high frequency burst is transmitted, the transfer driver 22 generates a transfer pulse which may or may not be applied to the clock interrupt circuit 13, thereby preventing any further shifting of the return pulse or pulses through the BBD or CCD shift register 6. The transfer pulse is applied to the N parallel outputs 7 to transfer the contents of the BBD or CCD 6 to the N individual display drivers 26. The return pulse entered the BBD or CCD shift register 6 some X clock periods after the high frequency impulse was transmitted. The return pulse then began to be shifted serially at the rate of one bit per clock period. Other reflected signals that appear will have return pulses produced by the receiver-detector 4. These return pulses will also be applied to the shift register input. When the contents of the shift register 6 are transferred to the display drivers 26, M clock periods after the transmission of the impulse through the water, the return pulse is located in the Yth bit of the shift register ($X + Y = M$). Since the interval between transmission of the high frequency signal and sampling of the shift register 6, M clock periods, is known and the return pulse is found in the Yth bit of the register, a display 9 may be calibrated to show the delay time between transmission and return of the high frequency impulse (X clock periods) thereby displaying the distance traveled to the reflecting object.

The reflected signal or signals and associated return pulses will vary in amplitude depending on the type of reflecting object encountered. The return pulse is thus an analog value. Since the display drivers linearly amplify the contents of the shift register, the display may vary in brightness to match the analog value of the return pulse. This feature is valuable since a trained observer of a depth sounder display may be able to interpret such an analog type display to indicate the type of lake or ocean bottom terrain, as well as the presence of fish and underwater brush and trees.

Once the contents of the BBD or CCD 6 have been transferred out and a display produced, the system is in its initial status awaiting the beginning of a new cycle. The new cycle begins again with a transmit-receive control pulse and repeats the above described operation.

Display Devices

There are a variety of display devices which may be utilized in the embodiments of the present invention. Each of these devices would necessarily include logic and control subsystems used to encode the output of the solid state depth sounder and process that output to a form suitable for use with the desired display format. These logic and control subsystems are of the conventional type and will not be described in detail here.

Referring now to FIG. 9, a typical such display device is illustrated. A series of twenty visible light emitting diodes 27 are arranged to simulate visually the high frequency sound impulse sent from the transducer through the water. For example, in FIG. 9, there are two light emitting diodes 28 and 29 which are shown to be lit. The lower VLED 28 would be an indication that the lake or ocean bottom is eighteen feet below the surface of the water, while the VLED 29 indicates that a fish or other reflecting object appears twelve feet below the surface of the water. The scale in feet of the VLED display 9 is determined by the range control switch 12 which operates to vary the clock frequency produced by the variable clock generator 8. Only 3 ranges are shown here but these and other ranges might be included within the concept of this invention. In addition, FIG. 9 illustrates the range portion select feature which might be included within the concept of this invention as described in the second embodiment thereof. This feature may be provided by including means for varying the time intervals at which the transfer driver circuit 22 generates a transfer pulse.

When such a display device is used with a solid state depth sounding system as described in the second embodiment of this invention, the analog return pulses which are amplified and used to drive the individual VLED's will provide a display in which the strength of the reflected signal will determine the intensity of the light emitted. Using the example of FIG. 9, the upper VLED would be dimmer than the lower since a fish would normally reflect less of the transmitted sound impulse than does a lake or ocean bottom. Since the first embodiment of this invention operates in a digital on/off mode with uniform height pulses driving the VLED's, no such relative signal strength indication would be given in that case.

Figure 10A:
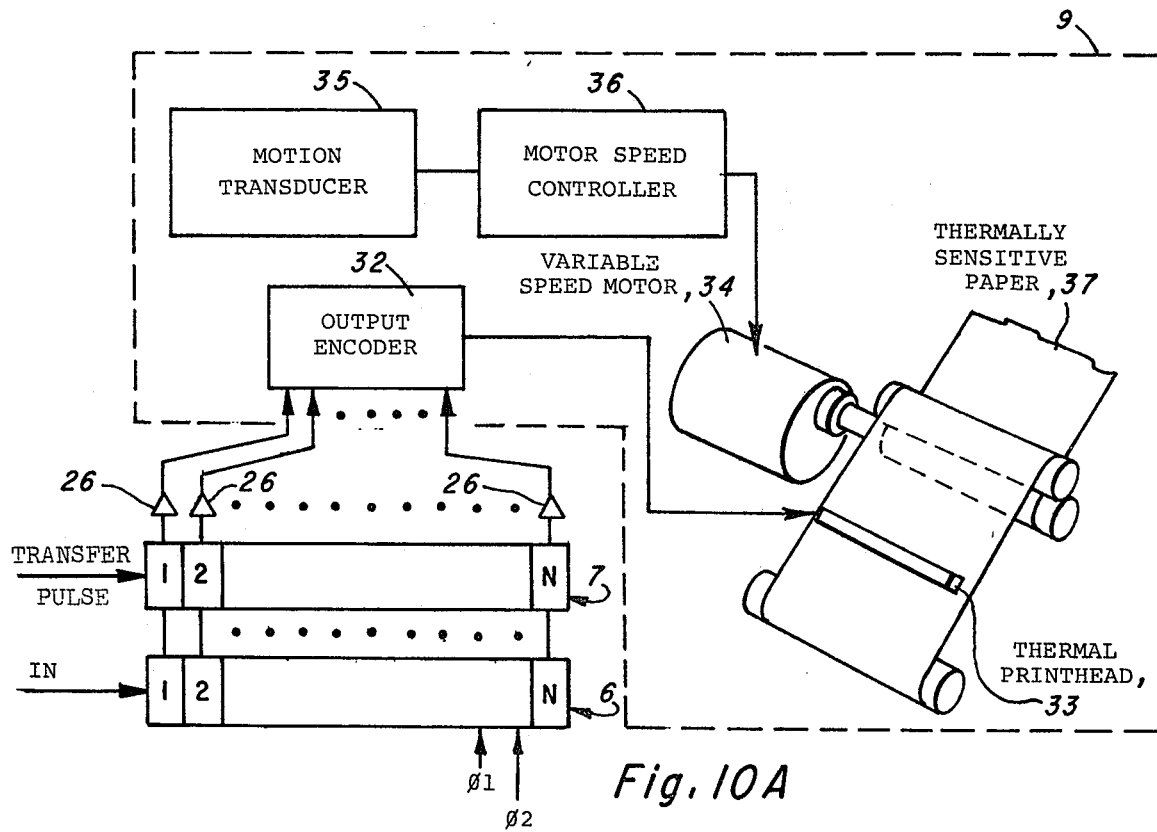
FIGS. 10A and 10B are a diagram showing the method by which a hard copy display may be produced and a drawing depicting a typical such output.

FIG. 10A depicts a display system which features a hard copy printout of the data received by the solid state depth sounder. This system includes an output encoder 32 suitable for use with a thermal printhead 33 in the desired format of the hard copy printout. A motion transducer 35, a motor speed controller 36, and a variable speed motor 34 are used to drive the thermally sensitive paper 37. The motion transducer 35 is used to produce a signal which may be calibrated to indicate the boat speed to the motor speed controller 36 which drives the variable speed motor 34 at a rate proportional to the boat speed. The motion transducer 35 may be of the type which is operated by the flow of water across the boat's hull or may be of the pressure sensitive type. The variable speed motor 34 is used to drive the thermally sensitive paper 37 across the thermal printhead 33. As described in the second embodiment of this invention, at predetermined time intervals the contents of the shift register of the solid state depth sounder are transferred to the output encoder 32 which will provide a signal to the thermal printer 33. This type of display device is also acceptable for use with the first embodiment of this invention.

Figure 10B:
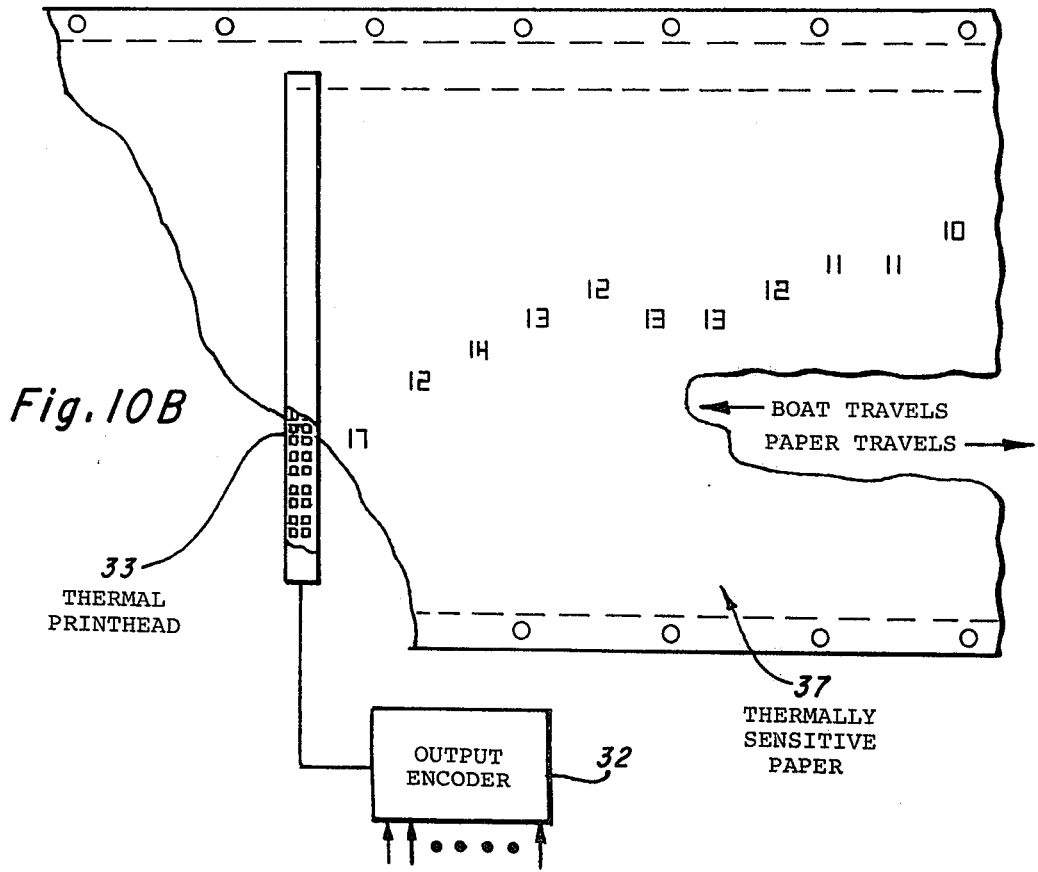

The thermal printhead 33 may be of the type in which there are a number of elements which print numbers or characters in various positions as shown in FIG. 10B, or it may be of the type which consists of a single character such as a dot or line in each of the number of positions on the printhead 33. In either case, by driving the thermally sensitive paper 37 at rate proportional to the boat's speed and printing a numeral or other character at specified intervals at a position of the printhead corresponding to the depth to the reflecting object, a hard copy printout of the data from the solid state depth sounder can be obtained. In this manner, a contour of the bottom may be produced. An example of this type of printout is shown in FIG. 10b.

Third Embodiment

This embodiment is substantially similar in construction and operation to those devices described in the first and second embodiments, except that a number of such devices are used in conjunction with a hard copy printer as previously described and illustrated in FIGS. 10A and 10B or other suitable display device so as to provide multidirectional depth sounding capability.

Figure 6:
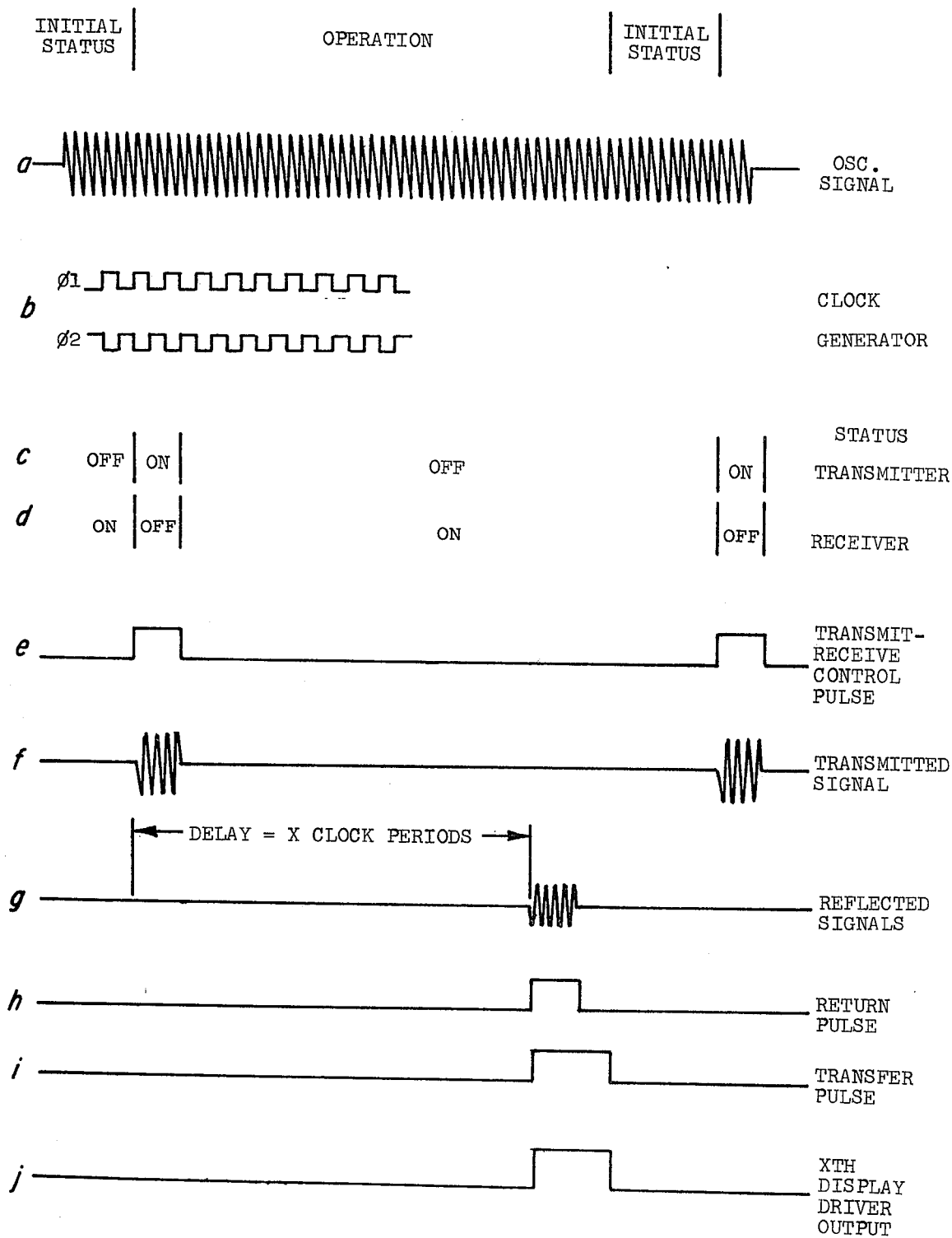
FIG. 6 is a timing diagram illustrating the operational cycle of the first embodiment of this invention.
Figure 11A:
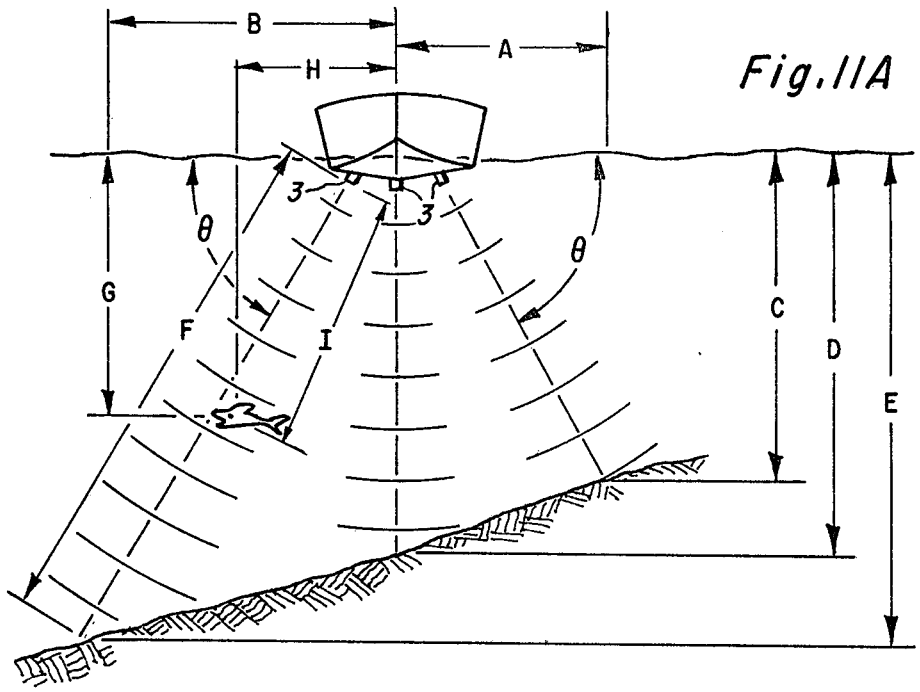
FIGS. 11A, 11B and 11C are diagrams illustrating the multidirectional depth sounding capability and drawings showing typical display techniques which might be used to present multidirectional depth sounding data.
Figure 11B:
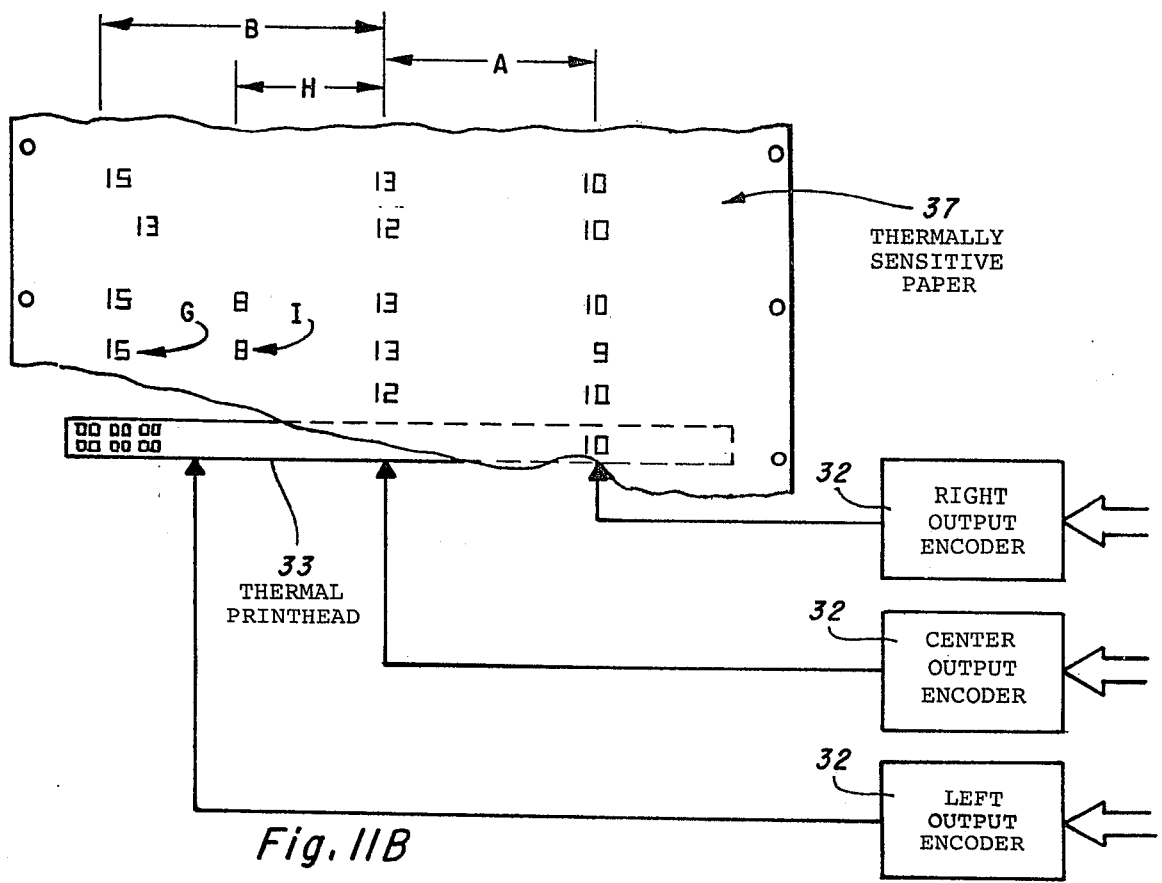

With reference now to FIGS. 11A and 11B, there are three transducers 3 illustrated. Each of these transducers is part of a solid state depth sounder device as illustrated in FIG. 2 or FIG. 6. The three depth sounder systems are operating at slightly different master oscillator frequencies to prevent the high frequency sound impulse from one transducer interfering with the high frequency impulse from another. The filter in each receiver-detector 4 is centered on the master oscillator frequency for that device and operates to effectively prevent reception of signals from the other devices. In this manner each device is unidirectional, but together two or more devices yield accurate multidirectional capability.

With particular reference now to FIG. 11A, the transducers 3 are situated such that the left and right transducers are each pointing in a direction which is at a specified angle from the horizontal surface of the water. With the proper calibration means included in the output encoder 32, this angle may be varied to allow the selection of the desired lateral range.

Though there are three transducers 3 with associated individual solid state depth sounders illustrated in FIGS. 11A and 11B, any number of such devices might be used so as to cover a wider area or provide greater resolution of the depth data obtained. Further, in other embodiments, one device being moved regularly to different positions and using a number of different oscillator frequencies is able to scan the bottom and produce the same type of results.

Since the depth sounder does not literally measure depth except when the high frequency sound impulse is projected in a direction perpendicular to the surface of the water, the "left" and "right" depth sounder devices are measuring the distance to the reflecting objects. For example, with respect to the "left" system, the distances to reflecting objects are denoted by the reference letters F and I. These distances are measured, and the angle $\theta$ is specified; thus, the lateral ranges B and H and the depths E and G may be easily determined. The lateral range B is equal to the measured distance F multiplied by the cosine of the specified angle $\theta$; depth E is equal to the sine of the specified angle $\theta$ times the measured distance F. The lateral range H and depth G to a shallower reflecting object may be similarly calculated. Since the sine and cosine of the specified angle $\theta$ are constants, they may be calibrated into the display. The "right" depth sounder device functions similarly.

The "center" device operates in the manner described in the first or second embodiments of this invention since the distance to the reflecting object is equal to depth in this case.

The display system illustrated in FIG. 11B includes output encoders 32 for each of the three depth sounding devices and a single thermal printhead 33. The printer 33 responds to signals from the various output encoders to print measured depths at the appropriate lateral range on thermally sensitive paper 37 (driven at a rate proprotional to boat speed). The output encoders 32 provide signals which, according to the depth range, will cause the thermal printer 33 to print the measured depth in feet at the proper location on the strip chart.

Figure 11C:
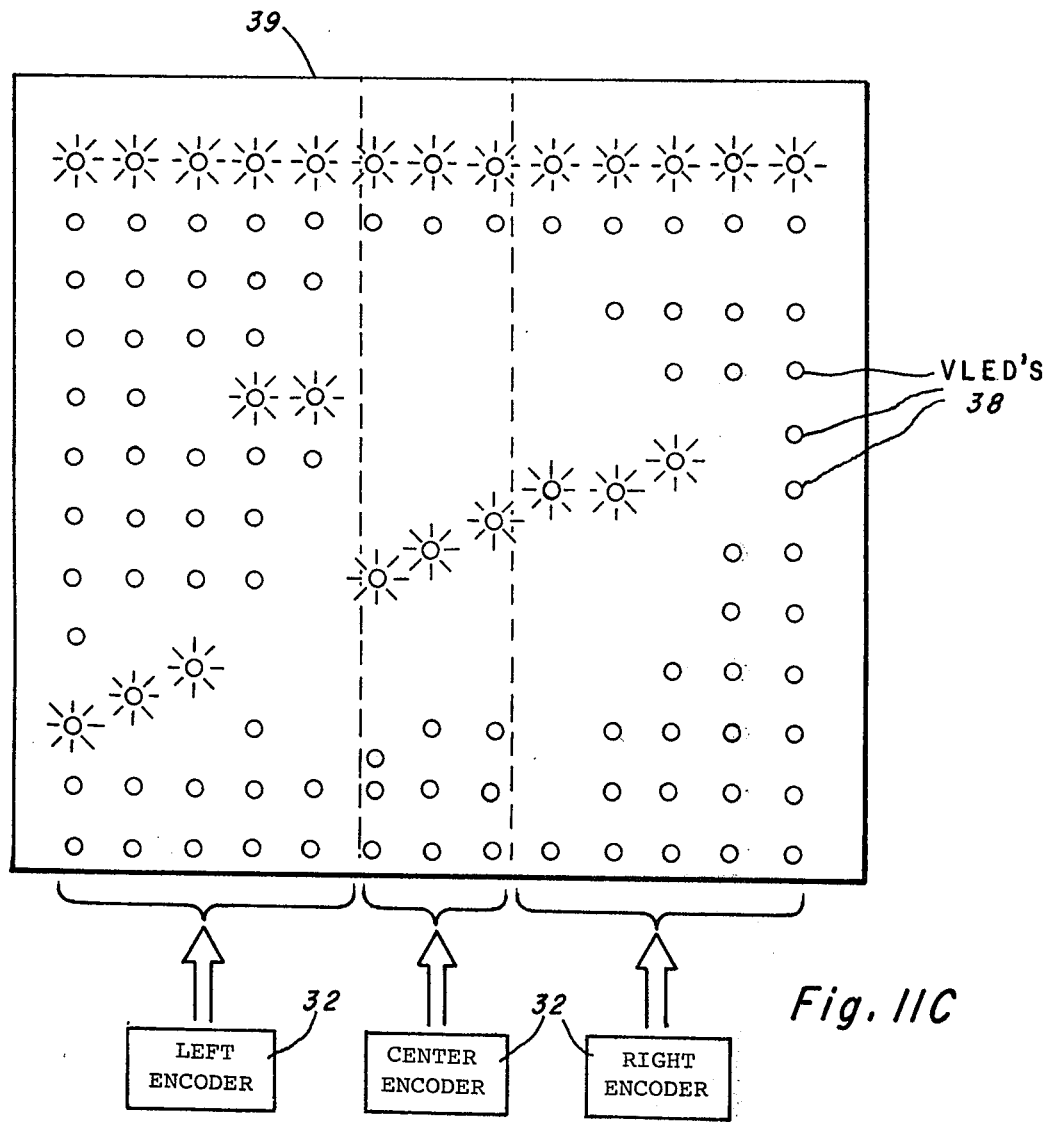

In addition to the hard copy output described above, an array 39 of individual VLED's 38 may be utilized with the proper encoding means 32 to indicate a bottom contour as detected and measured by a multibeam depth sounder. Referring to FIG. 11C, such an array 39 is shown indicating the bottom contour of FIG. 11A. The lateral positioning and depth measurement is accomplished in a manner similar to that previously described. This type of display is also capable of indicating shallower reflecting objects such as fish or under water debris. This display technique has the added advantage of being able to present relative signal strength data by using analog pulses to drive the individual VLED's 38. Of course, for greater resolution and a more accurate picture of the under water region, a larger number of the unidirectional depth sounder systems may be incorporated to scan the depths in more detail.

Various modifications of the disclosed embodiments, as well as other embodiments of the invention, may become apparent to persons skilled in the art without departing from the spirit and scope of the invention as defined by the appended claims. Accordingly, it is contemplated that the appended claims will be interpreted to cover any such modifications or embodiments as fall within the true scope of the invention.

I claim:

1. A system for measuring depth, said system comprising:
  a. means for producing high frequency sound impulses and periodically transmitting said impulses through the water at predetermined time intervals;
  b. means for receiving high frequency sound impulses reflected from a number of reflecting objects;

c. means for producing return signals which are each coincident in time to one of said reflected high frequency sound impulses and are analog values directly related to the strength of said reflected high frequency sound impulses;

d. means for producing desired clock frequencies;

e. means for measuring the time elapsed between transmission of the high frequency sound impulse and the reception of the reflected sound impulse, said means comprising:

i. a shift register device having a serial input and a specified number of bits through which an analog signal appearing at said input may be shifted at a rate related to the clock frequency;

ii. means for applying said analog return signal or signals to the input of said shift register, said analog return signal or signals being shifted serially through said shift register for timing reference;

iii. means to sample, upon the occurrence of a specified transfer signal, the individual bits of the shift register device and produce analog output signals corresponding to the bit or bits in which a pulse was found and corresponding to the analog values of said pulses, whereby said output signals have an analog value directly related to the strength of said reflected high frequency sound impulses;

iv. means for producing said transfer signal periodically at desired time intervals, said transfer signal having a specified duration; and f. an analog display output means capable of producing a visual display from the analog output signals of the time delay measurement means, said display being calibrated to indicate depth to the reflecting objects, and said display output means being further capable of indicating the relative strength of the reflected high frequency sound impulses.

2. A system for measuring depth as defined in claim 1 wherein said shift register device is further defined as a bucket brigade device with a serial input and a specified number of bits.

3. A system for measuring depth as defined in claim 1 wherein said shift register device is further defined as a charge coupled device with a serial input and a specified number of bits.

4. A depth measuring system as defined in claim 1 wherein said analog display output means comprises:

a. means for producing an analog display of numerals or characters when driven by specified analog display signals, wherein the intensity of the display is determined by the analog value of the signals used to drive the display; and b. means for encoding said analog output signals, so as to produce said analog display signals which will drive said numerical and status display means to show numerically the depths of the various reflecting objects and to indicate by relative intensity of the display the relative strengths of the various reflected signals.

5. A depth measuring system as defined in claim 1 wherein said analog display output means comprises a linear display means capable of indicating depth to the reflecting objects and relative strengths of the reflected signals.

6. A depth measuring system as defined in claim 1 wherein said analog display output means comprise:

a. a specified number of analog display elements arranged linearly; and b. means for encoding said analog output signals, corresponding to bit position of analog pulses in the shift register device and corresponding to the analog values of said pulses, so as to produce analog display signals which will drive the proper ones of said analog display elements, whereby the depths of the various reflecting objects will be shown and the relative strengths of the various reflected sound impulses will be indicated by the relative intensity of the displays produced by the driven elements.

7. A depth measuring system as defined in claim 1 wherein said analog display output means comprises:

a. a specified number of analog numerical display elements, arranged linearly; and b. means for encoding said analog output signals to produce analog display signals which will drive the proper ones of said analog numerical display elements to indicate numerically the depths of the various reflecting objects, said encoder means further including means for producing said encoded display signals directly related in analog value to said analog output signals, whereby the depths of the various reflecting objects will be shown numerically in a position related to the depth, and whereby the relative strengths of the various reflected sound impulses will be indicated by the relative intensity of the numerical displays produced by the driven elements.

8. A multidirectional depth measuring system, said system comprising:

a. a specified number of depth measuring systems as defined in claim 1, each of said depth measuring systems further including means to indicate the lateral range of the various reflecting objects, said lateral range indication means being calibrated in realtion to the direction in which said high frequency sound impulses are transmitted; and b. means for specifying the high frequency associated with each of the depth measuring systems, whereby each of the depth measuring systems may be made to operate at a different frequency.

9. A multidirectional depth measuring system, said system comprising:

a. a specified number of depth measuring systems as defined in claim 1, wherein said display output means of each individual depth measurement system comprises:

i. a two dimension array of analog display elements;

ii. means to correlate the delay measured by said time delay measurement means and the direction of transmission of the high frequency sound impulse and to produce analog display signals to said array of analog display elements, whereby the lateral range and depth of the various reflecting objects will be displayed, and whereby the relative strengths of the various reflected signals will be indicated by the relative intensities of the displays produced by the analog display elements; and b. means for specifying the high frequency associated with each of the depth measuring systems, whereby each of the depth measuring systems may be made to operate at a different frequency.

10. A system for measuring depth, said system comprising:

15 a. means for producing sound impulses of a specified high frequency, and periodically transmitting said impulses directionally through the water at predetermined time intervals;
b. means for selectively receiving sound impulses of a specified high frequency, said impulses being reflected from a number of reflecting objects;
c. means for producing return signals which are each coincident in time to one of said reflected high frequency sound impulses;
d. means for producing desired clock frequencies;
e. means for measuring the time elapsed between transmission of the high frequency sound impulse and the reception of the reflected sound impulse, said means comprising:
  i. a shift register device having a serial input and a specified number of bits through which a signal appearing at said input may be shifted at a rate related to the clock frequency;
  ii. means for applying said return signal or signals to the input of said shift register, said return signal or signals being shifted serially through said shift register for timing reference;
  iii. means to sample, upon the occurrence of a specified transfer signal, the individual bits of the shift register device and produce output signals corresponding to the bit or bits in which a pulse was found;
  iv. means for producing said transfer signal periodically at desired time intervals, said transfer signal having a specified duration; and
f. a display output means capable of producing a visual display from the output signals of the time delay measurement means, said display being calibrated to indicate depth to the reflecting objects.

11. A system for measuring depth as defined in claim 10 wherein said shift register device is further defined as a bucket brigade device with a serial input and a specified number of bits.

12. A system for measuring depth as defined in claim 10 wherein said shift register device is further defined as a charge coupled device with a serial input and a specified number of bits.

13. A depth measuring system as defined in claim 10 wherein said display output means comprises:
a. means for producing a display of numerical and status data; and
b. means for encoding said output signals, corresponding to bit position of pulses in the shift register device, so as to produce signals which will drive said numerical and status display means to show numerically the depths of the various reflecting objects.

14. A depth measuring system as defined in claim 10 wherein said display output means comprises:
a. means for printing numerical and status data on paper or film adjacent to said printing means; and
b. means for encoding said output signals, corresponding to bit position of pulses in the shift register device, so as to produce signals which will drive said numerical and status printing means to print numerically the depths of the various numerically reflecting objects.

15. A depth measuring system as defined in claim 14 further including:
means for driving said paper or film at a rate proportional to time or to motion of the depth measurement system through the water.

16

16. A depth measuring system as defined in claim 10 wherein said display output means comprises a linear display means.

17. A depth measuring system as defined in claim 10 wherein said display output means comprises:
a. a specified number of display elements arranged linearly;
b. means for encoding said output signals, corresponding to bit position of pulses in the shift register device, so as to produce signals which will drive the proper ones of said elements to be activated in a manner which will show the depths of the various reflecting objects.

18. A depth measuring system as defined in claim 17 wherein said display elements comprises means for displaying numerical data and wherein said encoder means comprises means for producing display signals which will drive the proper ones of said elements to show numerically the depth corresponding to that element.

19. A depth measuring system as defined in claim 17 wherein each of said display elements comprises means for printing characters on paper or film adjacent to said display elements, and wherein means are included, within said display output means, for driving said paper or film at a rate proportional to time or to motion of the depth measurement system through the water.

20. A depth measuring system as defined in claim 17 wherein each of said display elements comprises means for printing numerical data on paper or film adjacent to said display elements, wherein said encoder means comprises means for producing signals which will drive the proper ones of said elements to print numerically the depth corresponding to that element, and wherein means are included, within said display output means, for driving said paper or film at a rate proportional to time or motion of the depth measurement system through the water.

21. A multidirectional depth measuring system, said system comprising:
a. a specified number of depth measuring systems as defined in claim 10, each of said depth measuring systems further including means to indicate the lateral range of the various reflecting objects, said lateral range indication means being calibrated in relation to the direction in which said high frequency sound impulses are transmitted; and
b. means for specifying the high frequency associated with each of the depth measuring systems, whereby each of the depth measuring systems may be made to operate at a different frequency.

22. A multidirectional depth measuring system, said system comprising:
a. a specified number of depth measuring systems as defined in claim 10, wherein said display output means of each individual depth measurement system comprises:
  i. means for printing characters or numerals on paper or film adjacent to said printing means at a number of positions along a straight line;
  ii. means for encoding said output signals, corresponding to bit position of pulses in the shift register device, to produce signals which will cause said numerical and character printing means to print numerically the depth of the various reflecting objects in a specified position along a straight line;

iii. means to determine the printing positions of said numerical and character printing means, said positions being determined according to the lateral range of the reflecting objects;

iv. means for driving said paper or film at a rate proportional to time or motion of the depth measurement system through the water; and b. means for specifying the high frequency associated with each of the depth measuring systems, whereby each of the depth measuring systems may be made to operate at a different frequency.

23. A multidirectional depth measuring system, said system comprising:

a. a specified number of depth measuring systems as defined in claim 10, wherein said display output means of each individual depth measurement system comprises:

i. a two dimension array of display elements;

ii. means to correlate the delay measured by said time delay measurement means and the direction of transmission of the high frequency sound impulse and to produce display signals to said array of display elements, whereby the lateral range and depth of the various reflecting objects will be displayed; and b. means for specifying the high frequency associated with each of the depth measuring systems, whereby each of the depth measuring systems may be made to operate at a different frequency.

* * * * *